United States Patent [15] 3,671,865

Szumila et al. [45] June 20, 1972

[54] AUTOMATIC NET PARTICIPANT SYNCHRONIZER

[72] Inventors: Anthony D. Szumila, Levittown; Joseph J. Zimnoch, Trevose; John D. Bechtel, Hatboro; Harvey M. Steinberg, Philadelphia, all of Pa.

[73] Assignee: The United States of America as represented by the Secretary of the Navy

[22] Filed: Dec. 3, 1964

[21] Appl. No.: 415,827

[52] U.S. Cl. ...............................325/58, 178/15 BS, 178/50, 178/69.5 R, 340/172.5, 343/178, 343/179

[51] Int. Cl. .......................................G08c 15/06, H04j 3/06

[58] Field of Search ...............340/183, 150, 172.5; 343/175, 343/176, 177, 178; 179/16; 178/50, 15 BS; 325/58

[56] References Cited

UNITED STATES PATENTS 2,986,723 5/1961 Darwin et al. .......................179/15 BS

*Primary Examiner*—Benjamin A. Borchelt
*Assistant Examiner*—H. A. Birmiel
*Attorney*—G. J. Rubens, Henry Hansen and William C. Everett

[57] ABSTRACT

A digital data net communications system for a group of tactical units in which data is transmitted by each participant in turn to all of the other participants, in which participants may be added or subtracted from the net automatically and without interfering with the transmission of data between the others. One of the participants is designated the contact area commander and during his time slot automatically synchronizes the other participants' equipment, informs the other participants of the number of participants in the net, and any changes in the number of participants in the net thereby informing all participants of the net condition without the necessity of disrupting the transmission of data between other participants.

9 Claims, 8 Drawing Figures

INVENTORS
ANTHONY D. SZUMILA
JOSEPH J. ZIMNOCH
JOHN D. BECHTEL
HARVEY M. STEINBERG

BY [signature] [signature]
ATTORNEYS

INVENTORS
ANTHONY D. SZUMILA
JOSEPH J. ZIMNOCH
JOHN D. BECHTEL
HARVEY M. STEINBERG

BY

Henry Hansen
William C. Everett
ATTORNEYS

INVENTORS
ANTHONY D. SZUMILA
JOSEPH J. ZIMNOCH
JOHN D. BECHTEL
HARVEY M. STEINBERG
BY
William C. Everett
ATTORNEYS INVENTORS
ANTHONY D. SZUMILA
JOSEPH J. ZIMNOCH
JOHN D. BECHTEL
HARVEY M. STEINBERG
BY
ATTORNEYS

SLOT ASSIGNMENT

BIT SYNC

FRAME SYNC

INVENTORS
ANTHONY D. SZUMILA
JOSEPH J. ZIMNOCH
JOHN D. BECHTEL
HARVEY M. STEINBERG

BY

ATTORNEYS

AUTOMATIC NET PARTICIPANT SYNCHRONIZER

The invention described herein may be manufactured and used by or for the Government of the United States of America for governmental purposes without the payment of any royalties thereon or therefor.

The present invention relates to digital communication systems and more particularly to a net communication system (a number of communication stations equipped for communication with each other) for a group of tactical units participating in an attack, for example, helicopters, in which data is transmitted by each participant in turn to all the others, and in which participants may be added or subtracted from the net automatically without interfering with the transmission of data between the others.

In the field of digital data communication equipment it has been the general practice to resynchronize the entire net of participants every time the number of participants in the net was changed. This necessitated informing all of the participants by voice communication of the change of number of net participants and was very cumbersome, especially where, as is frequently the case in multiple helicopter attack problems, participants were continually coming in and going out of the net. An alternative was to have a maximum number of participant slots (the time allotted for each participant's transmission) in the net at all times and use only as many of the slots as there were actual participants. This greatly decreased the speed of data transmission.

The general purpose of this invention is to provide a digital data communication equipment which has a variable net allowing automatic entrance and exit of participants with automatic alteration of the cycle. In the present invention one of the participants in the net is designated the contact area commander (CAC). The CAC notifies each participant in the net of his slot and the CAC takes the last one in line. When a participant drops out of the net the CAC may leave that one slot vacant without undue delay, or he may assign the next to last man in line by voice communication to take that slot and himself take the new last slot in line. The signals that the CAC sends to each of the other participants in his time slot automatically synchronizes their equipment and informs their equipment of the number of participants in the net so that no communication is necessary with any of the other participants in the event of a drop-out. In case of an addition to the net, the CAC gives the addition his slot and takes the next slot after. As before, the signals the CAC sends to all the other participants' equipment automatically adjusts their equipment to provide for the extra participant. Thereby by a few signals transmitted by the CAC all of the other participants' equipments in the net are automatically readjusted for addition or subtraction of participants without the necessity of resynchronizing their equipment or informing them by voice communication of the new number of participants.

Accordingly, it is an object of the present invention to provide a multiple participant data communication system in which addition or subtraction of participants from the net is accomplished automatically.

Another object is a communication system directed by a contact area commander who signals to the other participants automatically to indicate number of participants and synchronization position.

A further object of the invention is the provision of a digital communication system having a net the length of which is variable dependent upon the number of participants.

Still another object is to provide an antisubmarine warfare helicopter communication system in which helicopters joining in and departing from the net may do so automatically without the necessity of resynchronizing the other helicopters in the attack system.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 6:
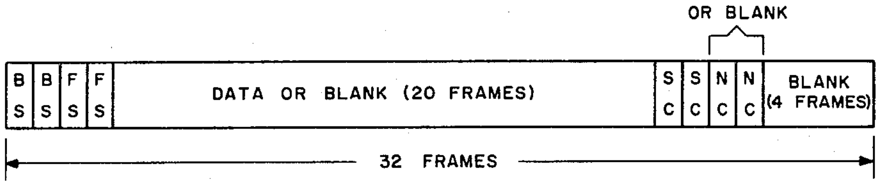
FIG. 6 shows the composition of a slot shown in FIG. 5.
Figure 7:
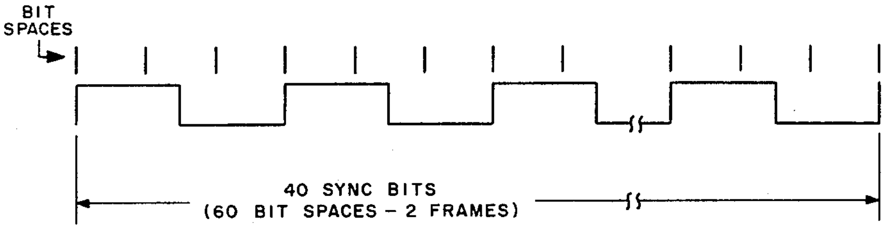
FIG. 7 shows a pair of bit sync frames in the slot pattern of FIG. 6.
Figure 8:
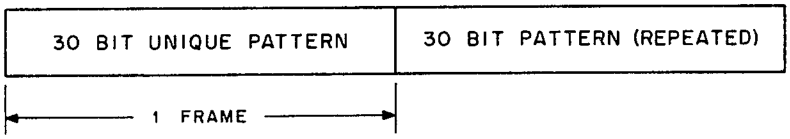
FIG. 8 shows a pair of frame sync frames in the slot pattern of FIG. 6.

The operation of the net is broadly described as follows. The contact area commander, known as CAC, assigns to each person in the net by voice communication a position or slot which may be anywhere from 1 to 31 which each person plugs in to his board under his own position. After this is done the CAC transmits 15 net cycles (the time between the beginning of two successive transmissions by the CAC) containing synchronization information. During these initial sync cycles none of the other stations transmit. At the end of 15 net cycles all of the participants are synchronized and each then begins in turn beginning with the CAC to transmit data to each of the other participants in the net. The make up of a typical slot is shown in FIG. 6. It is composed of 32 frames, the first two of which are bit sync frames and the second two of which are frame sync frames. These are shown in FIG. 7 and 8, respectively. Following these are 20 frames of data. This number is actually variable but is shown at 20 for purposes of this disclosure. During the initial sync cycle these 20 frames will be blanked for the CAC and all others. Following the 20 frames of data will be two frames of a stop code. During a sync cycle the CAC's stop code will consist of all "0"s which indicates to each of the other participants that this is a sync cycle and that they should look in the next two frames for synchronization information. When not in a sync cycle, the CAC and all others transmit a picket stop which is two frames of all "1"s. All frames in the slot contain 30 bits. During the sync cycle the next two frames after the stop code frames contain the synchronization information. This comprises three pieces of information. First, four bits indicating the net cycle. This will run up from 1 to 15. Second, the number of stations after synchronization in the net. Third, the number of stations presently in the net. For the initial synchronization these two are the same. Each of the other stations will be set on the number of stations presently in the net until the 15th cycle when it will switch to the new number of stations. For the initial synchronization this will stay the same. After this 15th cycle all of the stations will be synchronized in the net and each will be assigned his respective slot. When his turn comes, he will transmit his data to each of the others in turn. When a man signals that he is dropping out of the net the CAC will reassign the last man in line by voice communication to his slot. The CAC will himself take the last position in line and the CAC will reinitiate a resync cycle. During the resync cycle all of the other participants continue to transmit data as before so that resynchronization does not require interruption of data transmission. At the end of the 15 cycles of resynchronization all of the participants now remaining in the net are synchronized as before. If a new man comes on the scene the CAC will assign him his own slot and take the next slot thereafter. The CAC will again reinitiate a resync cycle and will transmit to each of the other participants the net cycle, the number of participants presently in the net, and the number of participants to be in the net. The participants previously in the net will continue to transmit data as before with the old number of participants until the 15th cycle when they will shift to the new number of participants. The new man will come into the slot automatically at the 15th cycle. By this means whether a man is being added or subtracted from the net, data transmission is continuous after the initial synchronization.

Figure 5:
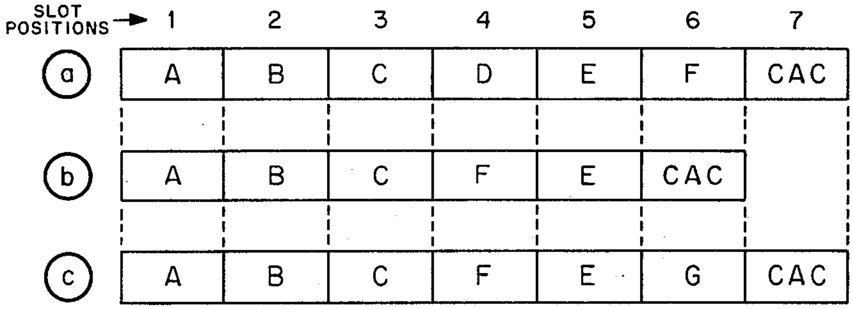
FIG. 5 shows a representation of slots showing subtraction and addition of participants in the system of FIG. 1 according to the invention.

The foregoing is illustrated in FIG. 5 which shows at *a*, a typical cycle having six participants and the CAC. The six participants are designated A through F. They will be assigned respectively slots 1 through 6. The CAC will plug the number 7 into his equipment to designate seven participants in the net. If one of the participants, for example, participant D, drops out of the net, participant F will be assigned slot 4. The CAC will assign himself slot 6 indicating six participants in the new net and resynchronization will be initiated. The net will go on a seven slot cycle for 15 cycles and then switch (at *b*) automatically to six slots per cycle. If a new man comes in, for example, participant G, he will be assigned slot 6 and the CAC will assign himself slot 7 indicating seven participants in the new net. A resync cycle will be initiated. The six participants previously in the net will operate on a six slot cycle for 15 cycles and G will come in automatically at the end of 15 cycles and all participants will transfer to a seven slot cycle, as shown at *c*.

Figure 1:
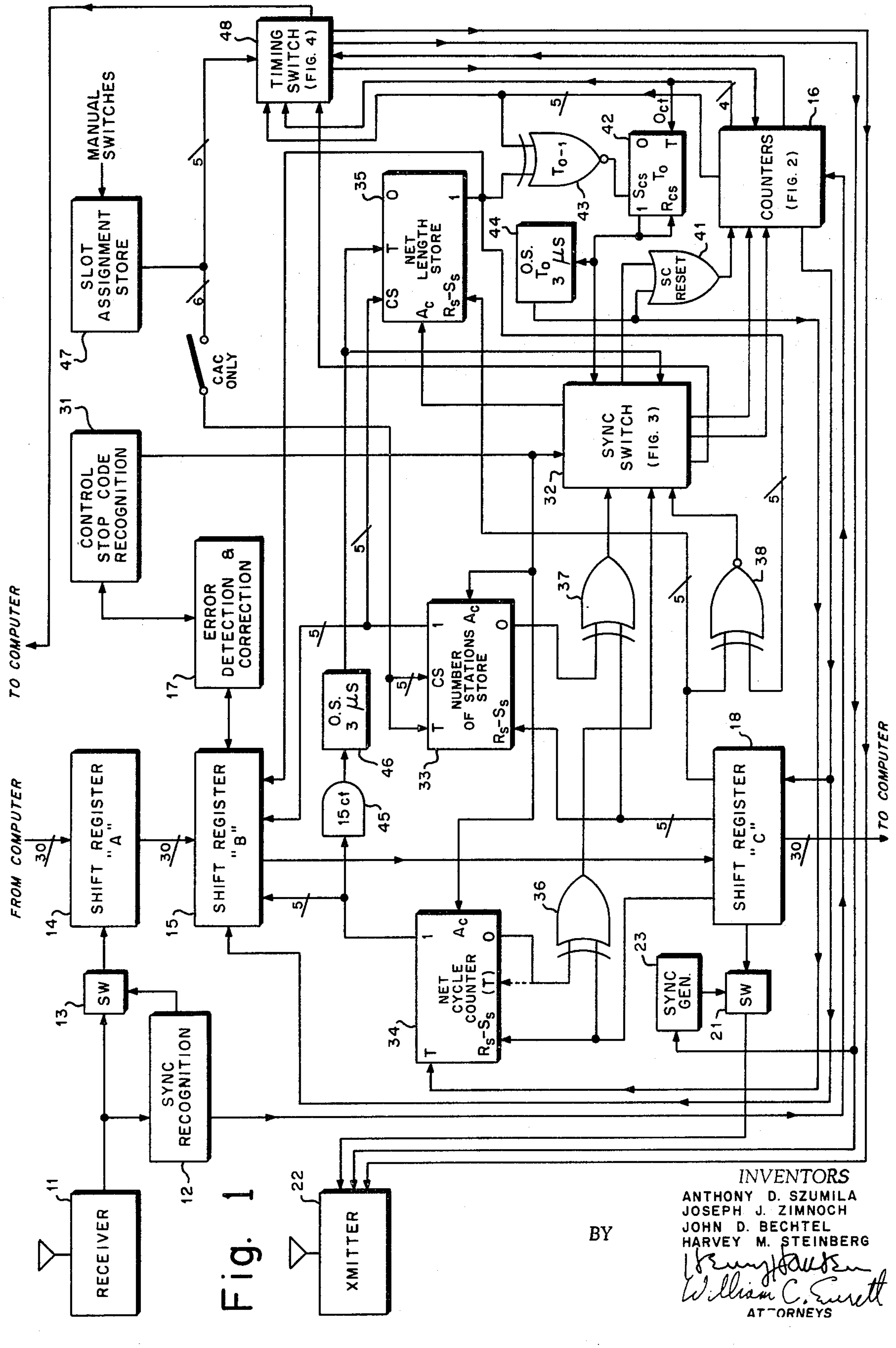
FIG. 1 shows a block schematic diagram of a digital data communication system according to the invention.

Turning now to FIG. 1, there is shown in the system a receiver transmitter of a typical participant in the net. A receiver 11 receives digital data transmitted serially, which passes to a sync recognition 12, which analyzes for recognition of the bit sync and frame sync frames. The bit sync uses two frames of special bits one and a half times as long as the regular bits, as shown in FIG. 7. The frame sync uses two identical frames of regular bits of a unique pattern, as shown in FIG. 8. When the bit sync and frame sync frames are spotted, a switch 13 is opened by a signal from sync recognition 12, and the data is fed serially into a shift register 14, designated shift register A. Shift register A contains thirty places and will receive thirty bits of data transmission at a time. At the end of 30 bits the contents of shift register 14 are shifted down to shift register 15, designated shift register B. This is caused by a signal from a counter system 16 to be described in more detail in connection with FIG. 2. The counter system has been initiated by a signal from sync recognition 12. When the data is in the shift register B it is checked by standard error detection and correction equipment 17 and shortly thereafter by another signal from counter system 16 it is transferred down to a third shift register 18 designated shift register C. If the system is synchronized at this point, the data in shift register 18 will be transferred out to a computer in the equipment which will analyze it and use it in the attack operation. During the participant's transmitting time slot, shift register 14 will receive computer data 30 bits at a time from the equipment's own computer. This will be transferred to shift register 15 and to shift register 18 in order, from which it will be fed out serially through a switch 21 to a transmitter 22 and out to the other equipment. Before the data is transmitted out frame by frame, a sync generator 23 will generate the four frames of bit and frame sync frame information. The 20 frames of data from the computer will then be followed by two frames of the picket stop code or, if the participant is the CAC, and he is in a sync cycle, by the control stop code and then by the sync information which will be fed into shift register 15 and then down to shift register 18 in turn. Following these 28 frames of transmission, the transmitter will transmit nothing for 4 frames. This time is necessary for antenna turn-around for all of the participants in the net.

The synchronization of the net is accomplished as follows. If the slot transmitted by the CAC contains a control stop code of all zeros for two frames, this will be recognized in a control stop code recognition 31. Two frames after the control stop code recognition 31 spots the control stop code it will send an activation signal to a sync switch 32, a number of stations store register 33 and a net cycle counter 34. The sync switch 32 will also process this activation signal and under certain circumstances will pass it along to a net length store register 35. In the meantime the next 2 frames of synchronization information have been placed in shift register C. The effect of the activation signal is to place in net cycle counter 34 the contents of the four positions indicating the net cycle, in the number of stations store register 33 the number of stations to be in the net, and in the net length store register 35 the number of stations presently in the net. For initial synchronization these last two will be the same. The contents of the net cycle counter 34, the number of stations store register 33 and the net length store register 35 are then checked by appropriate comparison gates 36, 37 and 38 which, if the signals check, will send appropriate enabling signals to the sync switch 32 for purposes to be explained later. In the sync switch 32 a check is made to see if there are two successive cycles synchronized. When there are, a signal is sent down to the counter system 16 for appropriate timing purposes which will be described subsequently in connection with FIG. 2. A signal is also sent to counter system 16 through a slot counter reset gate 41 for appropriate counting purposes. The counter system 16 will proceed to count slots. At the beginning of a slot it will send an output signal to a $T_0$ flip-flop 42 which has been activated by a comparison gate 43 comparing the condition of the net length store register 35 to the condition of the counter system 16. When the $T_0$ flip-flop 42 goes on 1, it sends a $T_0$ signal to sync switch 32 and also activates a $T_0$ one shot 44. $T_0$ one shot 44 feeds a signal back to slot counter reset gate 41 which provides timing information to counter system 16. The pulse from $T_0$ one shot 44 also passes to the trigger of net cycle counter 34 to advance it one. By that means net cycle counter 34 will move up one slot at a time until it along with the other participants reaches the 15 count. When the participants reach the 15 count, it will be recognized by a 15 count gate 45 which will then activate a 15 count one shot 46 which will send a trigger signal to the net length store register 35. The effect of this trigger signal on register 35 is to place the contents of the number of stations store register 33, which are linked to the CS point of register 35, on register 35, which now contains the number of stations in the new net. It will be seen therefore that at the 15 count the number of stations has been switched from the old number to the new number. In the case of initial synchronization since both were the same there is no change. The participant will then continue to participate in the net and to transmit in his turn.

The timing of the participation of each participant in the net is achieved as follows. Each participant including the CAC will place his slot number on a slot assignment store 47. This information will be placed continuously into a timing switch 48. For the CAC only this information will also be placed together with a trigger in the number of stations store register 33. In the initial signal for the CAC this information will also be placed in the net length store by an appropriate trigger. During the appropriate frames in his slot the contents of the CAC's cycle counter 34, register 33 and register 35 will be placed in shift register 15 which will then be transferred down to shift register 18 and transmitted. All other participants will place the contents of their assignment store 47 in the timing switch 48. In the timing switch 48 the contents of the slot assignment store will be compared with the condition of counter system 16 in a manner which will be described subsequently in connection with FIG. 4. At the appropriate time in the cycle, signals will be sent by timing switch 48 to the transmitter 42, to the sync generator 23, and to the computer of the equipment to indicate time for transmission.

Figure 2:
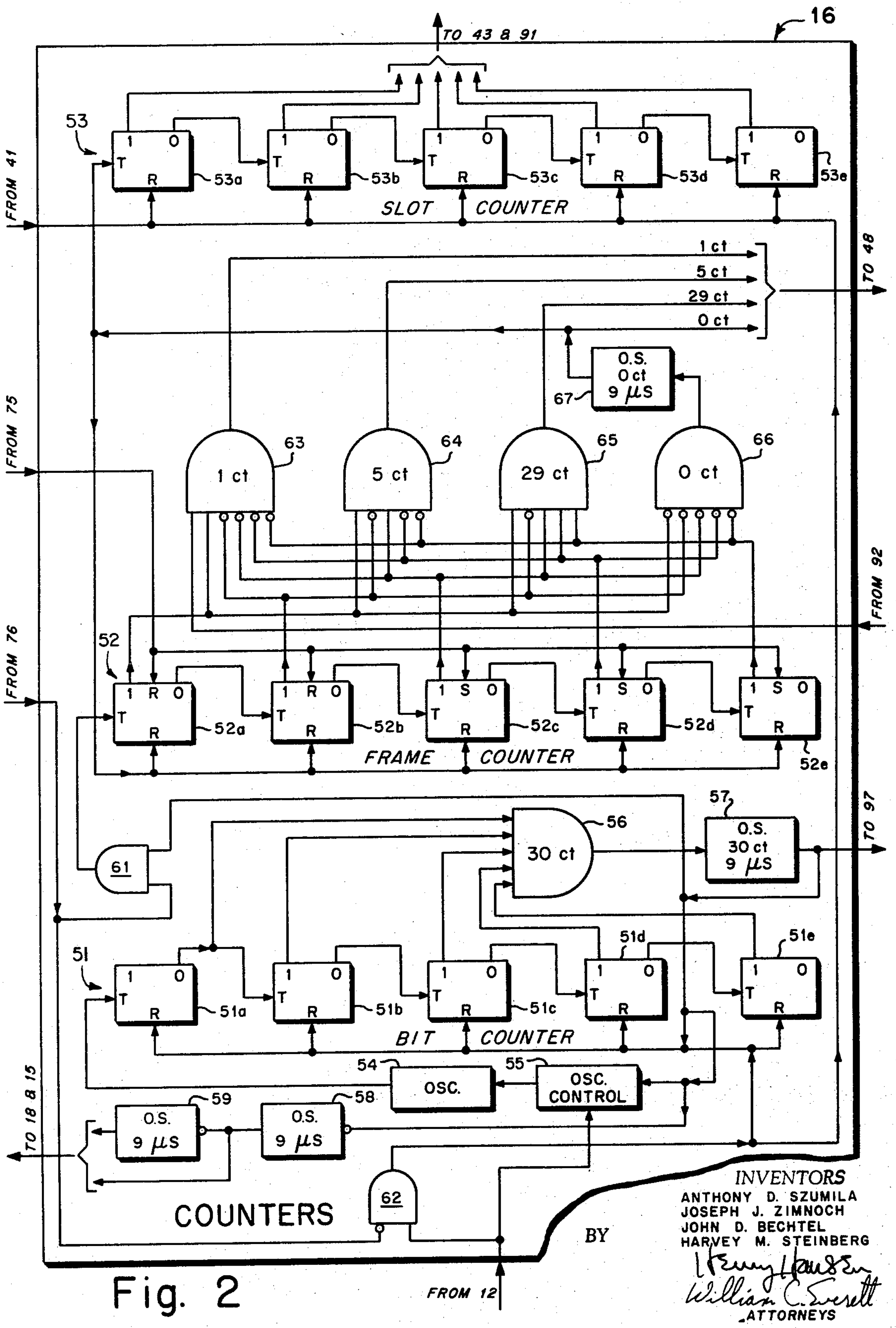
FIG. 2 shows a circuit diagram of a counter subsystem of FIG. 1.

The counter system as shown in FIG. 2 comprises a bit counter 51 having stages 51*a* through 51*e*, a frame counter 52 having stages 52*a* through 52*e*, and a slot counter 53 having stages 53*a* through 53*e*. Bit counter 51 is triggered by an oscillator 54 which is controlled by an oscillator control 55. When bit counter 51 has counted to 30 it actuates a 30 count gate 56, which activates a 30 count one shot 57, which resets bit counter 51 at zero. The output of 30 count one shot 57 is also sent out to timing switch 48 for reasons which will be set forth subsequently. The output of 30 count one shot 57 also is passed back to oscillator control 55 where it is compared with the signal from sync recognition 12 to check on the alignment of oscillator 54. The output of the 30 count one shot 57 is also sent to a pair of one shots 58 and 59 which send out a pair of pulses, the first, from one shot 58, delayed from the output of 30 count one shot 57 by 9 microseconds, and the second, from one shot 59, delayed from the output of one shot 58 by nine microseconds. The first of these signals is sent up to shift register 15 to cause it to receive information from shift register 14 and the second of these outputs is sent to shift register 18 to cause it to receive data from shift register 15. The output of 30 count one shot 57 is further sent to a gate 61 which feeds into frame counter 52. This signal however is not allowed to pass into frame counters 52 until there is an enabling signal into gate 61 from sync switch 32 which indicates that the equipment is synchronized. This same signal from sync switch 32 which indicates that the equipment is synchronized is passed to a gate 62 to inhibit it. Gate 62 until it is inhibited by the synchronizing signal will receive signals from sync recognition 12 to reset bit counter 51. Once the equipment is synchronized as indicated by the signal from sync switch 32, frame counter 52 is allowed to operate and the resetting signal into bit counter 51 from sync recognition 12 is inhibited.

Connected to the outputs of the frame counter 52 are a set of logic gates 63, 64, 65 and 66. Gate 63, as shown, tests for a one count on frame counter 52, gate 64 tests for a five count, gate 65 tests for a 29 count, and gate 66 tests for a zero count. The output of the zero count gate 66 operates a zero count one shot 67. The four timing counts, one, five, 29 and zero, are sent out to timing switch 48. The output of zero count one shot 67 is also sent back to the reset of counter 52. In the case shown, where counter 52 will automatically reset at the end of its count, which is 32 frames long, it is unnecessary to send back a reset signal. However, in the event that there are a number of data frames other than 20, the reset count may not be zero. For example, if the number of frames is up in the area of 50 or 60 there will be six stages, and the frame counter will be reset on a number other than 32 or 64. In that event, the output of the one shot 67 would be led back to the reset to start the frame counter over again. The output of the one shot 67 is also led up to the first trigger of slot counter 53 to indicate the beginning of a slot.

Slot counter 53 is reset by a signal from slot counter reset gate 41 which is actuated either by a signal from $T_0$ one shot 44 or by a signal from sync switch 42. In the operation of the device the zero count is also sent up to the trigger of $T_0$ flip-flop 42, which will set flip-flop 42 on one if there is an enabling signal on exclusive OR gate 43. When that is the case it indicates that $T_0$ has been reached and $T_0$ one shot 44 will be activated to reset the slot counter. If, in the event that gate 43 has not been actuated, the zero count into the trigger of $T_0$ flip-flop 42 would be ignored. The outputs of slot counter 53 are also sent to the exclusive OR gate 43 which will compare them with the outputs from net length store register 35 to detect whether $T_0$ has been reached.

At this point it should be mentioned that the actual input into each slot assignment store 47 is one less than the actual slot assignment, which means that if there are six participants in the net the contents of net length store register 35 would be five, not six, and when slot counter 53 counts up to five it will match with net length store register 35 to enable flip-flop $T_0$. On the next trigger which will come at the end of that slot, flip-flop $T_0$ 42 will be set on "1" to indicate the start of the CAC slot. Each of the participants in turn will have the contents of slot counter 53 compared with a number one less than his slot assignment, so that at the next trigger from zero count one shot 67 from frame counter 52 he will be told to begin transmitting.

Figure 3:
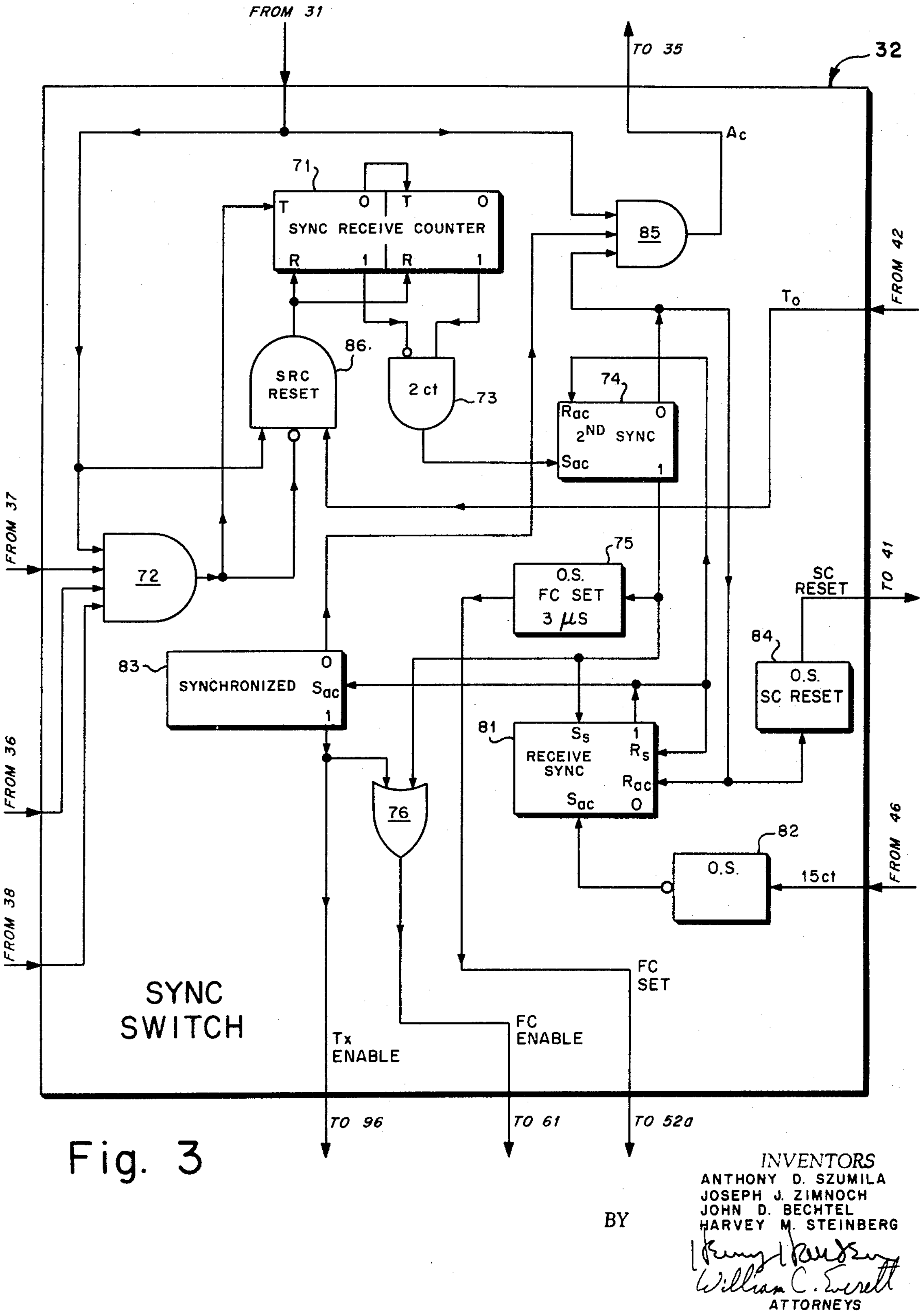
FIG. 3 shows a circuit diagram of a synchronization switch in the system of FIG. 1.

In the sync switch 32 of FIG. 3 there is shown a sync receive counter 71. Counter 71 is triggered by a signal from a gate 72 which is fed by the three outputs from the three comparison gates 36, 37 and 38 shown in FIG. 1, as well as a signal from the control stop code recognition 31. When a pulse from control stop code recognition 31 is received, and all three gates 36, 37 and 38 are on, the sync receiver counter 71 will be triggered once. If it is triggered twice in a row, i.e., if two cycles from the CAC are received in good order a two count gate 73 will activate a second sync flip-flop 74 to set it on "1". This will cause the activation of a frame counter set one shot 75. A pulse from one shot 75 is sent down to frame counter 52 in FIG. 2, which as indicated will set it on 28. A signal is also sent through an OR gate 76 to enable gate 61 leading in to the frame counter and to allow it to count the number of frames from bit counter 51.

The "1" output from second sync flip-flop 74 also puts an enabling signal on a receive sync flip-flop 81, but this does nothing as yet. When the net cycle counter 34 reaches its fifteen count it sends a pulse output from one shot 46 which is sent to the activate point of receive sync flip-flop 81 through a one shot delay 82. This sets receive sync flip-flop 81 on "1", which causes a synchronized flip-flop 83 to be set on "1". This sends an output through OR gate 76 to enabling gate 61 in FIG. 2 to hold gate 61 open. In addition the signal from receive sync flip-flop 81 is sent to the activating point of second sync flip-flop 74 where it sends that flip-flop back to "0". The result of this is to send another activating signal to the receive sync flip-flop 81 to put it back on "0" again and to activate a slot counter reset one shot 84. This one shot sends the signal down to the slot counter to reset it at zero. An AND gate 85 takes as inputs the control stop code recognition pulse, the "0" point of synchronized flip-flop 83, and the "0" point of second sync flip-flop 74. Initially all of these are on and, therefore, gate 85 will have a pulse output at the time of the output of the control stop code recognition pulse. This is fed to the activating point of net length store register 35 to cause it to take in the contents of shift register 18 indicating the present number of slots in the net. However, once synchronized flip-flop 83 goes on, gate 85 is inhibited. It is also inhibited first when second sync flip-flop 74 goes on "1". The output of synchronized flip-flop 83 also goes out to timing switch 48 to enable the transmission signal from that switch. The sync receive counter 71 is reset by a signal from a sync receive counter reset gate 86 which has as inputs the control stop code recognition pulse, the inversion of the output of gate 72, and a signal from $T_0$ flip-flop 42. What this means is that if during the $T_0$ frame the control stop code recognition pulse comes in and everything is not all right with gates 36, 37 and 38, sync receive counter 71 will reset before it can reach two. By this means if a good slot is received followed by a bad slot, sync receive counter 71 will be reset before it can reach two and, therefore, two successive good slots must be received in order to set the equipment in synchronization.

Figure 4:
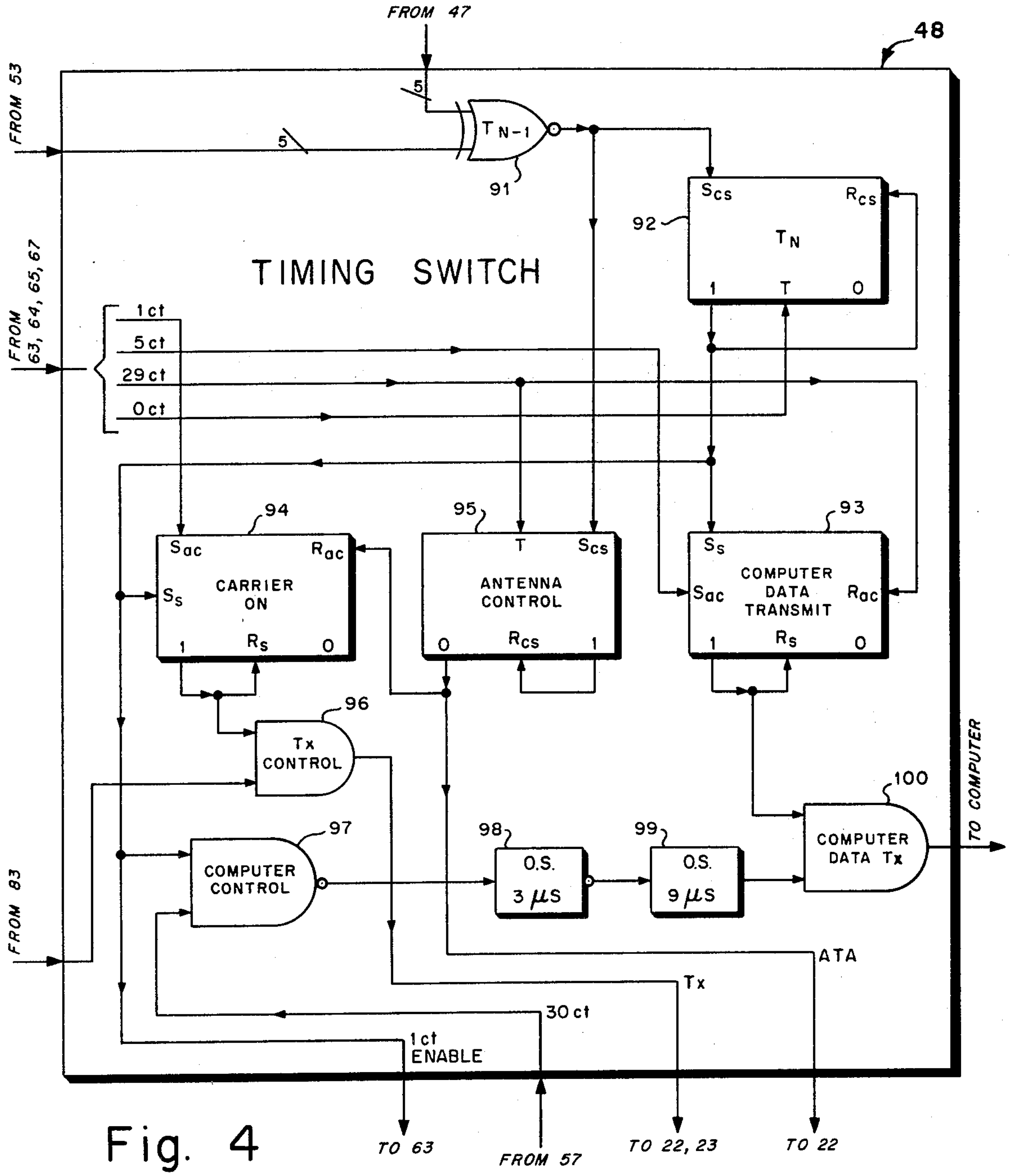
FIG. 4 shows a circuit diagram of a timing switch in the system of FIG. 1.

In the timing switch 48, as shown in FIG. 4, the contents of the slot assignment store 47 are compared with the condition of the slot counter 53 in an Exclusive OR gate 91. It will be recalled that the contents of the slot assignment store 47 are actually one less than the number of the participants in question. When gate 91 is high it will enable a control signal $S_{cs}$ in a $T_N$ flip-flop 92. At the next zero count from the frame counter 52, $T_N$ flip-flop 92 will be triggered and set on "1". This will set a control signal in a computer data transmit flip-flop 93 and a carrier on flip-flop 94. When $T_{N-1}$ gate 91 is high it also sets a control signal on an antenna control flip-flop 95. When the one count signal comes into the timing switch 48, it sets the carrier on flip-flop 94 to a "1". When the five count signal comes in it sets the computer data transmit flip-flop 93 on "1", and when the 29 count comes in its sets the antenna control flip-flop on "1", and resets the computer data transmit flip-flop 93 to "0". The antenna control flip-flop 95, when it is on "1", sends a low signal from the "0" position out to the antenna control to put it in the transmit position. At the next 29 count it is put back on high on the "0" position to put it in the receive position. The "0" position of the antenna control flip-flop 95 also resets the carrier on flip-flop 94.

When the carrier on flip-flop 94 is on the "1" position it passes a signal to a transmit control gate 96. AND gate 96 is enabled by a signal from sync flip-flop 83 in the sync switching means. When both are on, there is an output from gate 96 which is sent out to the transmitter 22 and the sync generator 23. The output from antenna control flip-flop 95 is sent out to the transmitter. The output of the "1" position of flip-flop 92 is also sent back to the counter mechanism to enable the one count gate 63. This signal is also sent to a computer control gate 97 which, acting through two one shots 98 and 99 sends a pulse to a computer data transmit gate 100. This pulse will pass through gate 100 when computer data transmit flip-flop 93 is on "1". The pulse passing through passes up to the computer to signal that it is to pass a frame of information from the computer to shift register 14.

The detailed description of the operation of the net is as follows. Each participant at the start of the operation presses a manual clear button which resets all flip-flops to zero. Each participant then plugs into his own slot assignment store 47 his own position. It will be recalled that the slot assignment store actually takes on a number one less than this position. The CAC plugs his number into his slot assignment store 47 and in addition puts this on the net station store register 33 and the net length store register 35. The CAC also puts a direct set on synchronized flip-flop 83 thereby bypassing the operation of sync switch 32. The CAC then broadcasts for fifteen cycles. In his time slot in each cycle the contents of his net cycle counter 34, his number of stations store register 33, and the contents of his net length store register 35 are placed into shift register 15 where they are transferred down to shift register 18 and transmitted after the appropriate control stop code in his slot in each cycle. The other participants receive the bit sync and frame sync as transmitted by the CAC, then twenty blank frames, then the control stop code, and then the contents of the CAC's registers and net cycle counter. Each participant need receive only two of these cycles in succession. As soon as each participant receives one cycle the contents of this cycle are put on his net cycle counter 34, number of stations store register 33, and net length store register 35. When this has occurred two cycles in a row sync switch 32 indicates synchronization, the frame counter 52 is started and his slot counter proceeds to count up. It will be recalled at this point that his slot counter started at zero and did not move until the frame counter was started when second sync was indicated on flip-flop 74. Thereupon, that participant will proceed to count up to fifteen independently of the CAC, and when he reaches fifteen count his synchronized flip-flop 83 will go on, and all parts of his equipment will be enabled. When a participant drops out, the CAC reassigns the man just under him to the slot which has been vacated. That man simply plugs the new slot assignment into his slot assignment store 47. The CAC then plugs the new slot number into his slot assignment store which is also put into the number of stations store. The contents of the net length store register 35 in the CAC remains at the old number of slots and the CAC then initiates a resync procedure, during which he will broadcast in the appropriate frames the control stop code followed by the number of cycles, the number of stations in the new cycle and the number of stations in the old cycle. All participants will continue at the old number of cycles until the fifteen count whereupon all of them will switch in unison to the new number of cycles. Data transmission from all participants continues uninterrupted during this procedure. When a new participant wishes to enter, the CAC assigns him to his own number and takes the next higher number. The new man receives the control stop code, the number of cycles, the new number of stations, and the old number of stations, but he is not yet synchronized. His net cycle counter will count up at the old slot rate fifteen cycles to the 15 count whereupon he will put on his net length store register 35 the contents of the number of stations store register 33 which is the new number of slots per cycle. His synchronized flip-flop 83 will then go on, and he will join in the data transmission. Again during this procedure data transmission from the other participants of the net proceeds uninterrupted and only the new participant is excluded from data transmission during the resynchronization cycle. During the original synchronization cycle and all resync cycles only the CAC broadcasts a control stop code followed by the contents of his net cycle counter 34, number of stations store register 33, and net length store register 35. All other participants at all times transmit a picket stop during the control stop code frames.

It will be seen from the foregoing description that the data net automatically allows the alteration of the net cycle to bring in new participants or let old ones out without interrupting data transmission within the net. There may if desired be more or less than 30 bits to a frame, and more or less than 20 data frames to a slot. The total frames per slot will equal the data frames, plus four frames for bit and frame synchronization, plus four frames for stop code and synchronization information, plus approximately four frames blank time for antenna adjustment. The count of gate 65 is set for the start of the blank time. The maximum number of participants will depend on the number of stages in the store registers. With five each, as shown, it is 32. With six each, it would be 64, etc.

The signal that leads to the activate point of counter 34 and register 33 may be taken from the output of gate 85 in FIG. 3. In this event, the counter 34 and register 33 would stop receiving the contents of shift register 18 after two cycles have been successfully received.

It will be understood that various changes in the details and arrangement of parts which have been herein described and illustrated in order to explain the nature of the invention may be made by those skilled in the art within the principle and scope of the invention as expressed in the appended claims.

We claim:

1. A digital data communication net system having a plurality of participants each sending data to the others at predetermined intervals, and one of which is selected as the commander, having means with each participant to control its transmission slot and reception slots, said means comprising:

a slot counter set for the number of participants in the net;
means with each participant to store manually the number of its slot;
means to compare the condition of said slot counter with said manual store;
means to transmit data from said participant upon condition coincidence of said slot counter with said manual store;
means to start said slot counter in response to a cycle begin signal from said commander, said slot counter thereafter cycling continuously;
a frame counter associated with said slot counter and capable of counting frames cyclically up to a predetermined number and sending a pulse to said slot counter once in each frame cycle; and
a bit counter for counting cyclically a predetermined number of bits and sending to said frame counter a pulse once each bit cycle.

2. A digital data communication net system as recited in claim 1 wherein said means to start said slot counter comprises:

means to respond to a unique code transmitted from said commander to start said frame counter.

3. A digital data communication net system as recited in claim 2, further comprising:

a net cycle counter,
a net station store register,
and a net length store register associated with each participant each adapted to receive information transmitted from said commander associated with said unique code; and
means to compare the contents of said slot counter with the contents of said net length store and reset said slot counter in response to coincidence between the contents of said slot counter and said net length store.

4. A digital data communication net system as recited in claim 3 wherein the commander transmits a predetermined number of cycles containing said unique code, each successive cycle containing one higher number supplied to the net cycle counter and further comprising:

means associated with said net cycle counter for detecting the occurrence of a predetermined number on said net cycle counter and responsive thereto placing the contents of said net station store register on said net length store register.

5. A digital data communication net system as recited in claim 4 having means associated with each participant to alter the number of participants in the net comprising:

means to receive from the commander the present number of stations in the net, the new number of stations in the net and the number of the cycle in which the commander is transmitting; and means occurring at said predetermined number to place the new number of stations in the net length store register.

6. A digital data communication net system as recited in claim 5 wherein said means to respond to said unique code comprises:

means to recognize said unique code and give an output pulse a predetermined time thereafter;

a sync receive counter to count a predetermined number of said output pulses and issue an output signal setting and enabling said frame counter; and means thereafter to increment said net cycle counter by one each cycle of said slot counter.

7. A digital data communication net system as recited in claim 6 further comprising:

a first shift register associated with each participant to receive transmitted information one frame at a time; and means occurring at said output pulse after recognition of said unique code to place the contents of a section of said first shift register on said net cycle counter, the contents of another section of said first shift register on said number of stations store register, and the contents of a third section of said first shift register on said net length store register.

8. A digital data communication net system as recited in claim 7, further comprising:

means associated with each participant to compare the contents of said net cycle counter, said number of stations store register and said net length store register with the appropriate sections of said first shift register and to inhibit and reset said sync receive counter upon non-match in said comparing means.

9. A digital data communication net system as recited in claim 8 further comprising:

a second shift register associated with each participant to receive said transmitted information;

means associated with said second shift register to recognize said unique code; and means associated with said bit counter to transfer the contents of said second shift register to said first shift register.

* * * * *